US007492786B2

(12) United States Patent
Ferris

(10) Patent No.: US 7,492,786 B2
(45) Date of Patent: Feb. 17, 2009

(54) SOFTWARE ENCODER FOR ENCODING DIGITAL AUDIO STREAMS

(75) Inventor: Gavin Robert Ferris, London (GB)

(73) Assignee: Radioscape Limited, London (GB)

( * ) Notice: Subject to any disclaimer, the term of this patent is extended or adjusted under 35 U.S.C. 154(b) by 995 days.

(21) Appl. No.: 10/296,735

(22) PCT Filed: May 25, 2001

(86) PCT No.: PCT/GB01/02339

§ 371 (c)(1), (2), (4) Date: Nov. 25, 2002

(87) PCT Pub. No.: WO01/91409

PCT Pub. Date: Nov. 29, 2001

(65) Prior Publication Data

US 2003/0133472 A1 Jul. 17, 2003

(30) Foreign Application Priority Data

May 25, 2000 (GB) ................................ 0012774.6

(51) Int. Cl.
*H04J 3/16* (2006.01)
*H04J 3/22* (2006.01)

(52) U.S. Cl. ...................................... 370/465; 370/535

(58) Field of Classification Search ................. 370/480, 370/485, 486, 487, 493, 535, 465; 375/347
See application file for complete search history.

(56) References Cited

U.S. PATENT DOCUMENTS

| | | | | |
|---|---|---|---|---|
| 5,333,155 | A | 7/1994 | Dambacher | |
| 6,044,396 | A | 3/2000 | Adams | |
| 6,421,387 | B1 * | 7/2002 | Rhee | 375/240.27 |
| 6,606,746 | B1 * | 8/2003 | Zdepski et al. | 725/37 |
| 2002/0194364 | A1 * | 12/2002 | Chase et al. | 709/236 |
| 2008/0117967 | A1 * | 5/2008 | Nakano et al. | 375/240.01 |

FOREIGN PATENT DOCUMENTS

| | | | |
|---|---|---|---|
| DE | 197 23 760 | A1 | 6/1997 |
| EP | 0 936 772 | A2 | 2/1999 |
| EP | 0 999 666 | A2 | 10/1999 |
| GB | 2 313 981 | A | 3/1997 |

* cited by examiner

*Primary Examiner*—Ajit Patel
(74) *Attorney, Agent, or Firm*—Saul Ewing LLP

(57) ABSTRACT

An encoder for encoding digital streaming media at a studio site, in which the encoder is a software encoder which uses an IP based protocol to communicate with a remote, central multiplexer. Because the encoder is a software encoder, it is significantly cheaper than conventional, dedicated hardware; the encoder can typically run on a PC or industrial PC. As an IP based protocol is used, the present invention is cheaper to implement than STI over G703/4 or a WG1/2 bus. Similarly, handling reconfiguration data is possible over IP and the software of the encoder also leads to increased reconfigurability. Placing the encoder at the studio site also eliminates the conventional need for extra codes in a central multiplexing paradigm, further reducing cost and increasing quality.

13 Claims, 4 Drawing Sheets

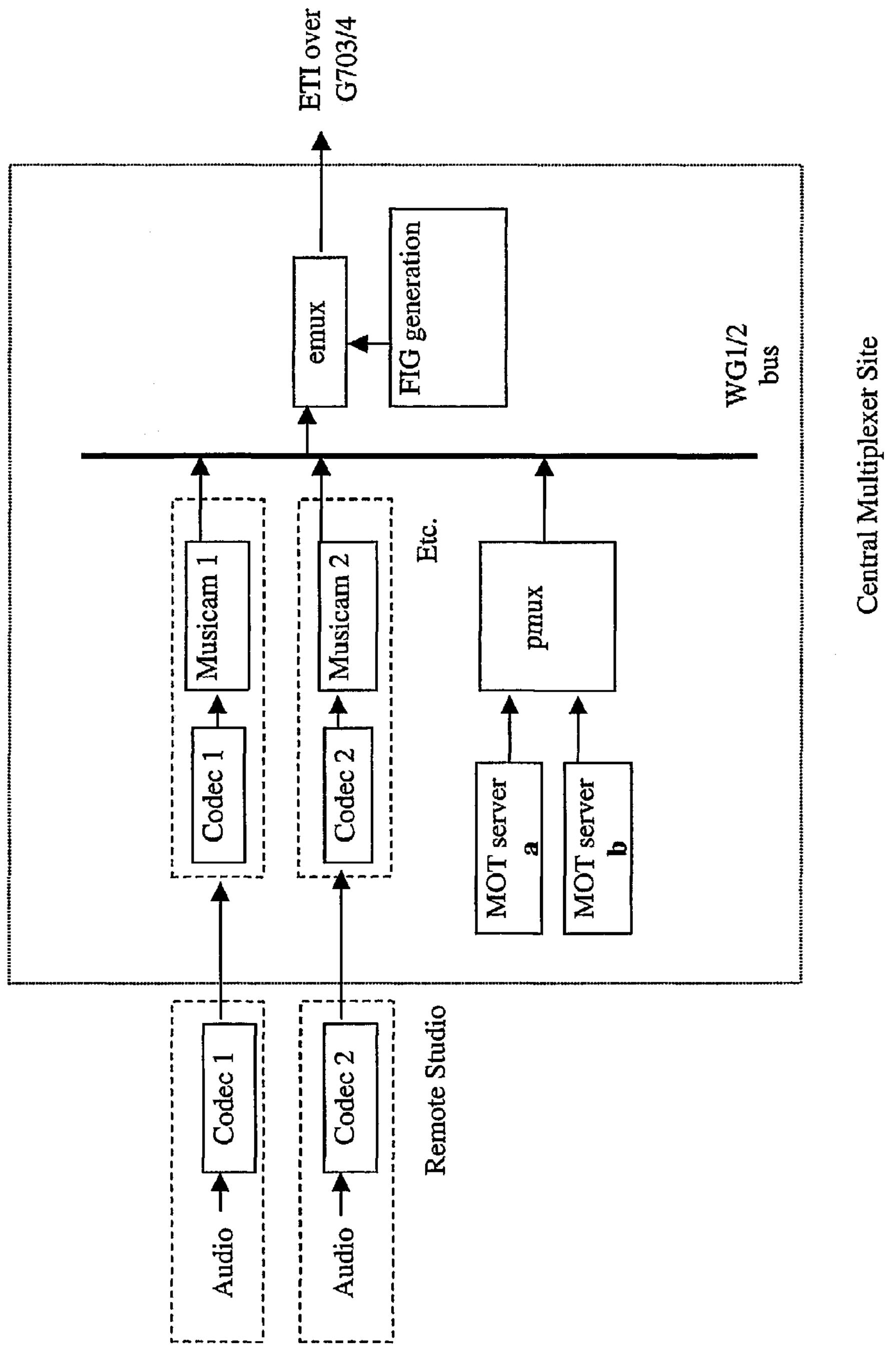
Figure 1: DAB Central Multiplexing Paradigm

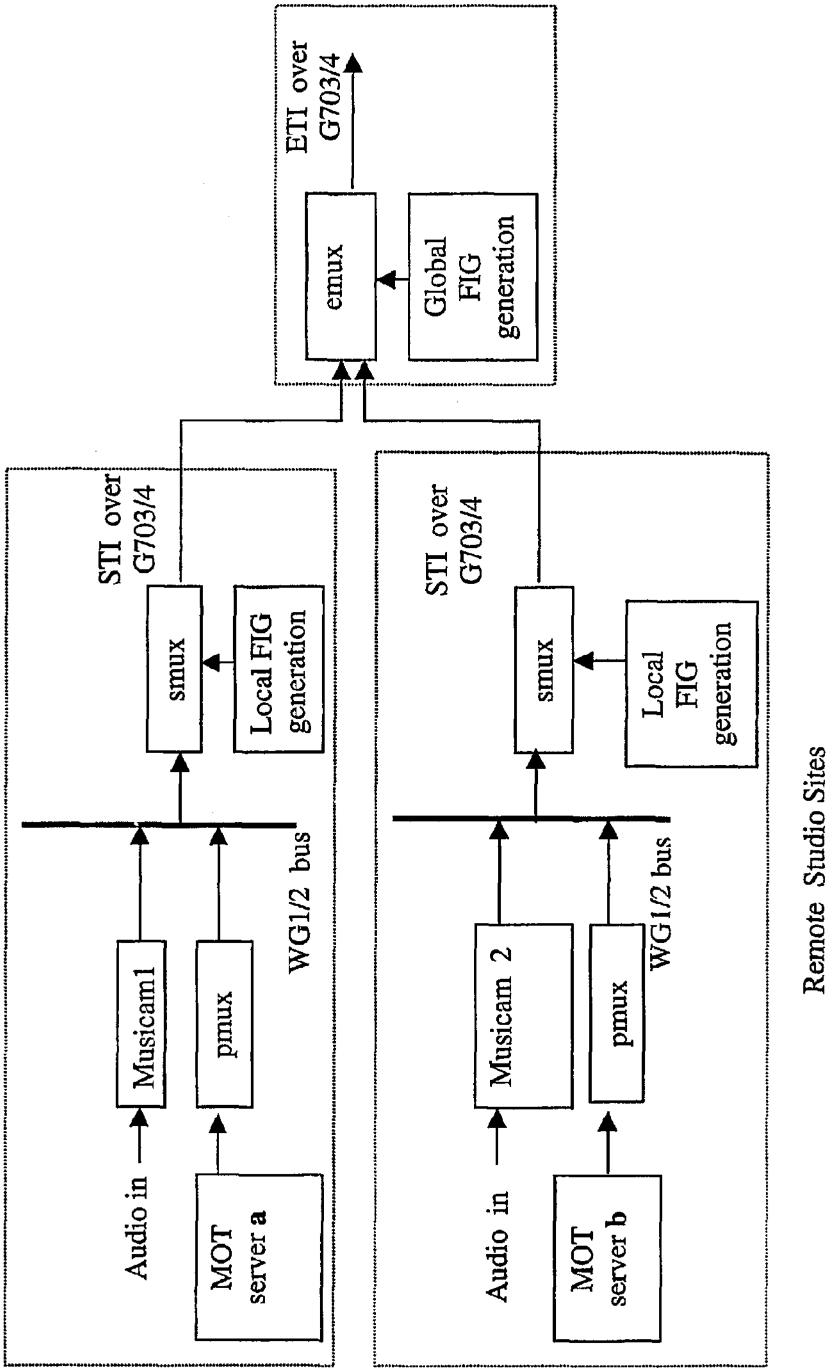
Figure 2: DAB Distributed Multiplexing Paradigm

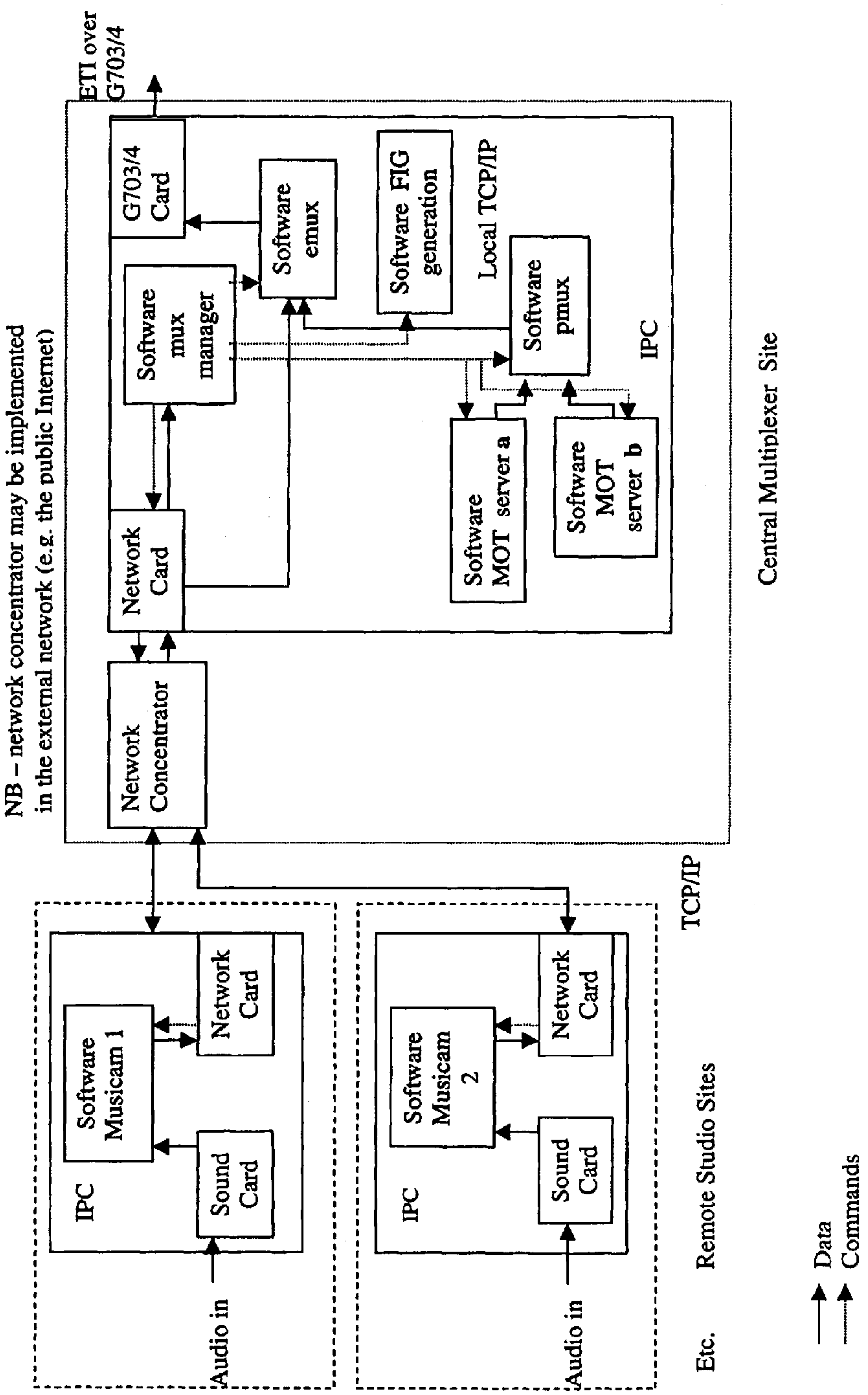
Figure 3: Remote Software Musicam Paradigm

Figure 4: Remote Software Service Multiplexer Paradigm
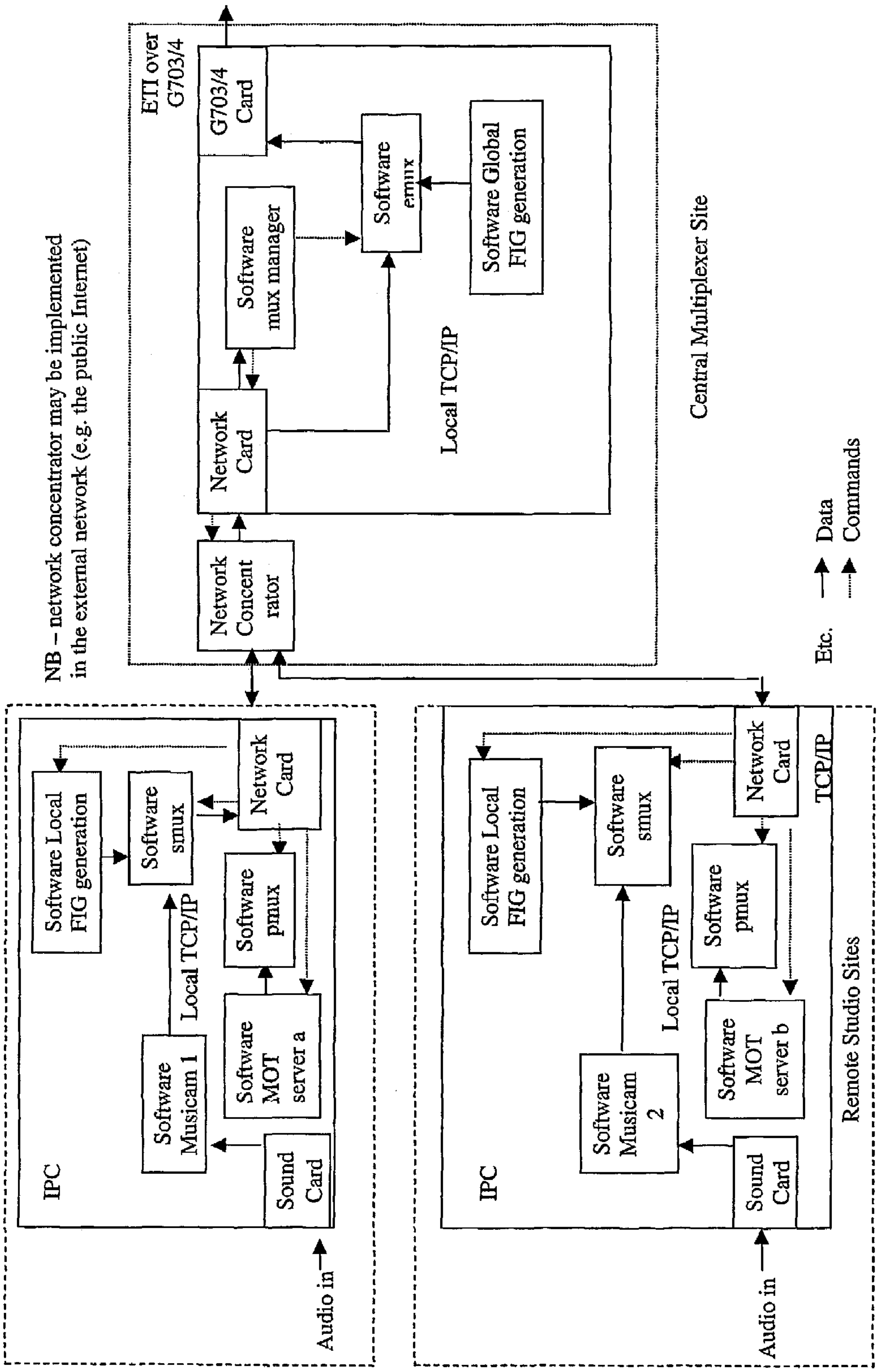

SOFTWARE ENCODER FOR ENCODING DIGITAL AUDIO STREAMS

CROSS REFERENCE TO RELATED APPLICATIONS

This application claims the priority of PCT Application No. PCT/GB01/02339 filed 25 May 2001 and British application GB0012774.6 filed 25 May 2000.

FIELD OF THE INVENTION

This invention relates to a multiplex architecture for digital streaming media, such as digital radio complying with the DAB (Digital Audio Broadcasting) or Eureka-147 standard. A multiplexer combines multiple logical streams in a single logical stream output over a network.

DESCRIPTION OF THE PRIOR ART

Streaming media multiplex system architectures are found for example in the DAB/Eureka 147 environment. Conventionally, Eureka-147 multiplex system architectures have been based around two paradigms, which exemplify the deficiencies in the streaming media multiplex system architecture prior art:

Central multiplexing, in which a single, central site takes in raw audio streams from a number of providers, generally transmitted over telecom lines using non-psychoacoustic codecs. This layout is illustrated in FIG. 1. Each stream is then fed into a corresponding Musicam encoder, which in turn outputs (compressed) stream data onto a common WG1/2 backplane bus. This data on this bus is read by the main ensemble multiplexer (emux), which composites it into a ETI format stream in G703 or G704 format. The emux also adds all the necessary FIGs (fast information groups) which are used to signal to the receiver the structure of the multiplex. One or more packet multiplexers (pmuxes) may also be used, which generate streams fed either directly to the emux or connected to the WG1/2 backplane bus. The pmuxes statistically multiplex packet data from various sources into a constant data rate stream. Services such as MOT web carousels can be transmitted using packet mode transport.

Distributed mutiplexing, in which a number of, potentially cascaded, service multiplexers (smuxes) is used 'upstream' of the main multiplexer. This layout is illustrated in FIG. 2. Each smux outputs data in a format known as STI, which is then transmitted over G703/G704 to a downstream node, which may either be another smux or (more commonly) the final emux site. With distributed multiplexing, service providers (e.g., radio stations) will generally have their Musicam encoders cited locally, feeding into the smux using the normal WG1/2 bus architecture, together with local pmux or pmuxes, MOT carousels, etc. In the distributed multiplexing paradigm, the FIG signalling for the components added by a particular mux node is generated by that node and sent downstream along with the rest of the data in the STI.

These are simplified descriptions, which ignore certain details (such as the insertion of PAD data into the Musicam frames, dynamic range control, etc.).

Central multiplexing suffers from issues of cost, flexibility and quality.

Cost, because DAB-specific, hardware-based units are (generally) used for the Musicam encoding and codecs, and because of the highly DAB-specific nature of the WG1/2 interfaces required on the emux and connected products.

Flexibility, because achieving a 'clean' reconfiguration with current generation hardware-based Musicam encoders is not straightforward, since it is very difficult to specify operations that are to happen at specific frame points (e.g., set the output bit rate from 128 kbps to 192 kbps at frame n).

Quality, because the use of non-psychoacoustic transmission codecs, often at a rate at or only slightly above the output rate of the Musicam encoders, generates significant noise within the payload audio.

Reference may also be made to EP 0999 666 (Lucent) and U.S. 60/444,396 (Adams). This prior art exemplifies the disadvantages of the prior art discussed above since each appears to disclose a central multiplexing approach, in which hardware based encoders are placed within the same site as the multiplexer. In general, with a centralised scheme, broadcasters have little freedom to modify their 'mix' of content within their allocated bandwidth within the multiplex. Where this flexibility is critical, the distributed architecture described above may be employed.

However, although distributed multiplexing does address the quality issue (since no intermediate codecs are used), it has the following problems:

Cost, because dedicated hardware Musicam encoders are still used, and because the emux must now be adapted to take in a (potentially large) number of STI streams over G703/4.

Flexibility, since the STI-C (control message set) specified within the Eureka 147 DAB standard is insufficient for reliable distributed reconfigurations to take place throughout the network.

Complexity, since managing the FIGs from various distributed sources in this manner without any central transaction management is an extremely difficult task to achieve reliably.

STATEMENT OF THE PRESENT INVENTION

In a first aspect of the invention, there is provided an encoding apparatus for encoding digital streaming media at a studio site, in which the encoder apparatus comprises:

(a) an encoder adapted to generate streaming media frames; and (b) a network access means to transmit the streaming media frames using a connection protocol over a network;

wherein (i) the encoder is a software encoder; and (ii) the network access means sends the streaming media to a remote, central multiplexer over an IP connection protocol.

Because the encoder is a software encoder, it is significantly cheaper than conventional, dedicated hardware; the encoder can typically run on a PC or industrial PC. As an IP based protocol is used, the present invention is cheaper to implement than STI over G703/4 or a WG1/2 bus. Similarly, handling reconfiguration data is possible over IP and the software nature of the encoder also leads to increased reconfigurability. Placing the encoder at the studio site also eliminates the conventions need for extra codecs in a central multiplexing paradigm, further reducing cost and increasing quality.

The encoding apparatus may communicate with a central multiplexer which is a software ensemble multiplexer; this central multiplexer may receive multiple IP based steams which have been processed by an IP switching apparatus to form a single input, such as an Ethernet input. The encoder may be controlled by a distributed API through which it is programmed by central multiplex manager software. As a consequence, frame specific seamless reconfigurations are possible. In one kind of implementation, each studio site will have several software encoders running on a PC or Industrial PC, each connected to a software service mux. The service mux may output the IP based protocol to communicate with the central multiplexer. Each software encoder can be controlled by a distributed API through which it is programmed by central multiplex manager software. In a typical implementation for DAB, the encoder is a Musicam encoder. The remote, central multiplexer may be located at a radio transmitter site and may then feed into the COFDM.

In a second aspect, there is a method of distributing streaming media from a studio site to a central multiplexer, comprising the following steps:

(a) generating streaming media frames at an encoder apparatus as defined in the first aspect;

(b) sending the streaming media frames to a remote, central multiplexer over an IP based protocol.

Further details of the invention are stated in the appended claims.

BRIEF DESCRIPTION OF THE DRAWINGS

The accompanying drawings are as follows:

FIG. 1: Prior Art: DAB Central Multiplexing Paradigm

FIG. 2: Prior Art: DAB Distributed Multiplexing Paradigm

FIG. 3: Remote Software Musicam Paradigm, in accordance with the invention; and

FIG. 4: Remote Software Service Multiplexer Paradigm, in accordance with the invention.

DETAILED DESCRIPTION

Several implementations of the present invention will be described. Each implementation is from the applicant, Radioscape Limited of the United Kingdom. Radioscape's scalable software-based multiplexing solution addresses the deficiencies in the prior art through the use of commodity hardware and protocols (industrial PCs, Ethernet adapters, IP based protocols etc), with core functionality (e.g., the emux itself) executed in software running on the PC architecture. Radioscape's solution has two main variants, depending on how much control is to be placed at the remote broadcaster sites.

1.1. Remote Software Musicam Implementation

In the first implementation, (shown in FIG. 3) which is geared more towards replacing the central multiplexer approach discussed above, a software implementation of the Musicam audio encoder is executed on an IPC at each studio/broadcaster site. Input is via a high quality sound card if an analogue feed or through an appropriate adapter card (which may be the same sound card) if a digital feed.

The Musicam encoder is controlled via an exposed distributed API through which it is programmed by the central multiplex manager software. The output of the encoder is a stream of MPEG frames, which are then transported, via an IP based protocol and industry standard network access interfaces (probably over a dedicated line to control jitter and latency), to the central mux site.

At this central site, an IPC executes the emux code, which accepts the various incoming IP based Musicam streams and composites them, and adds in FIG information to describe these streams. Note, however, that the various streams can be concentrated using existing IP switching technology onto e.g. a common Ethernet input to the IPC, thereby massively reducing cost (by removing the need for the WG1/2 bus). The pmux is also implemented in software under this model and communicates with the emux using normal inter-process communication methods (e.g., shared memory if running on the same IPC, IP connections over Ethernet if on a distinct IPC, etc.).

Note that this solution addresses the key disadvantages raised for the 'centralised' multiplexer system described above:

Cost is greatly reduced, because the need for extra codecs disappears (because the Musicam encoding has been pushed out to the studio), and furthermore, the need for DAB-specific hardware largely disappears. The RadioScape solution utilizes commodity protocols and hardware. This also has a significant impact on spares holding cost, and the speed with which such a system can be configured ready for use, both of which represent significant additional advantages.

Flexibility is greatly enhanced. Since the Musicam encoders are software based and are controlled via a distributed API from the central site, it is straightforward to perform frame-specific seamless reconfigurations on them (e.g., to move the output rate of an encoder from 128 kbps to 192 kbps at audio frame number n).

Quality is significantly improved, because removing the intervening codecs (generally non-psychoacoustic) means that the audio will only be subject to one lossy compression stage prior to transmission. This represents a significant benefit to broadcasters.

It is, of course, possible to run multiple software Musicam encoders on a single PC, subject only to the resource capabilities of the machine (sound inputs available, CPU cycles and memory available, network output bandwidth available, etc.).

1.2. Remote Software Service Multiplexer Implementation

The solution just described is still somewhat restrictive from a broadcaster's point of view, since they may wish autonomously to manage a particular bandwidth (e.g., 384 kbps) into which they will programmed a varying ensemble of audio and data services. To do this requires the use of a service multiplexer at the remote site. However, with RadioScape's software architecture, shown in FIG. 4, very much the same approach can be applied.

An IPC at each broadcaster's site is equipped with a number of software Musicam encoders, as just described. These then connect (using an IP based protocol, or some other appropriate communication mechanism, on the local machine rather than remotely) to connect to a software smux. This smux will output STI-D frames (the data part of STI) using an IP based protocol through a commodity network interface, probably over a dedicated telecom line to prevent problems with latency and jitter, to the emux. As with the remote Musicam example described above, commodity hardware can be used to concentrate the inbound traffic (e.g., into a set of IP connections over Ethernet).

Communications between the smuxes and the central emux use a distributed API to prevent the problems faced by STI systems regarding distributed transactions during a reconfiguration.

The IPC running each remote smux may, in addition to a number of software Musicam modules, may also host a number of pmuxes, MOT encoders, etc., limited only by the system resources (and if these prove insufficient, another IPC may simply be added, since the connections between each of the components has been structured to use an IP based protocol).

Therefore, RadioScape's solution addresses the difficulties raised with the distributed multiplexing architecture, described earlier, as follows:

Cost, because there are is now no need for specific hardware Musicam encoders, and because the input to the emux can use commodity hardware (Ethernet, Internet routers) and protocols (IP based).

Flexibility, since the STI-C command set is not used between the central multiplexer site and the software smuxes, with a distributed API under control of the multiplex manager being used instead.

Complexity, since the system is under control of a central manager, the complexity to be managed is greatly reduced.

Of course, the advantages of the remote software musicam system are also realised by the remote software smux system.

Although not described here, the system would also be appropriate for use in a 'cascaded smux' mode if desired.

Additional Issues

The only additional DAB-specific aspect of the system then becomes the particular payload format used in the G703/4 output of the emux. In an envisaged implementation, this interface is removed and the ETI data is streamed in transparent mode over a commodity IP based connection to the transmission sites to a software-implemented COFDM using commodity network capability.

In another envisaged implementation, a standard G703/4 card is used for the transmission, with software on the PC performing the necessary DAB-specific operations on the outgoing frames.

The invention claimed is:

1. An encoding apparatus to encode digital streaming media at a studio site, in which the encoding apparatus comprises:

(a) an encoder generating streaming media frames; and (b) a network access means to transmit the streaming media frames using an IP connection protocol over a network;

wherein (i) the encoder is a software encoder; and (ii) the network access means sends the streaming media to a central multiplexer at a remote site over the IP connection protocol; (iii) the encoding apparatus being situated at a studio site together with at least one other such encoder apparatus, each encoding apparatus running on a PC or Industrial PC, and each encoding apparatus being connected to a software service multiplexer over an IP connection protocol; and (iv) the encoding apparatus in which each encoding apparatus is controlled by a distributed API (application programming interface) through which it is programmed by central multiplex manager software.

2. The encoding apparatus of claim 1 running on a PC or industrial PC.

3. The encoding apparatus of claim 1 which is controlled by a distributed API through which it is programmed by central multiplex manager software.

4. The encoding apparatus as claimed in claim 1 programmed to allow frame specific reconfiguration.

5. The encoding apparatus of claim 1, with the service multiplexer connected to the network access means.

6. The encoding apparatus of claim 1, in which the software encoder is a Musicam encoder.

7. The encoding apparatus of claim 1 in combination with the remote, central multiplexer, wherein the remote, central multiplexer is a software based ensemble multiplexer.

8. The encoding apparatus of claim 7 in which the central multiplexer receives multiple IP based streams which have been processed by an IP switching apparatus to form a single input.

9. The encoding apparatus as in claim 8 in which the single input is an Ethernet input.

10. The encoding apparatus of claim 7 in which the remote central multiplexer is located at a radio transmitter site.

11. The encoding apparatus of claim 8 in which the IP switching apparatus is located at the radio transmitter site.

12. A method of distributing streaming media from a studio site to a central multiplexer, comprising the following steps:

(a) generating streaming media frames by an encoder at the studio site;

(b) transmitting the streaming media frames by a network access means using an IP connection protocol over a network, wherein (i) the encoder is a software encoder; and (ii) the network access means sends the streaming media frames to the central multiplexer at a remote site over the IP connection protocol;

(iii) the encoding apparatus being situated at a studio site together with at least one other such encoder apparatus, each encoding apparatus running on a PC or Industrial PC, and each encoding apparatus being connected to a software service multiplexer over an IP connection protocol; and (iv) the encoding apparatus in which each encoding apparatus is controlled by a distributed API (application programming interface) through which it is programmed by central multiplex manager software.

13. The method of claim 12 comprising the following steps:

(a) receiving encoded streaming media frames from several remote encoders; and (b) multiplexing the signals from each encoder.

* * * * *